(12) United States Patent
Roberts

(10) Patent No.: US 10,644,512 B2
(45) Date of Patent: May 5, 2020

(54) POWER DISTRIBUTION NODE

(71) Applicant: GE Aviation Systems Limited, Cheltenham (GB)

(72) Inventor: David Killin Roberts, Pershore (GB)

(73) Assignee: GE Aviation Systems Limited, Cheltenham (GB)

(*) Notice: Subject to any disclaimer, the term of this patent is extended or adjusted under 35 U.S.C. 154(b) by 99 days.

(21) Appl. No.: 15/916,483

(22) Filed: Mar. 9, 2018

(65) Prior Publication Data

US 2018/0294651 A1    Oct. 11, 2018

(30) Foreign Application Priority Data

Apr. 6, 2017 (GB) .................... 1705569.0

(51) Int. Cl.
*H02J 4/00* (2006.01)
*H02M 1/10* (2006.01)

(52) U.S. Cl.
CPC ................ *H02J 4/00* (2013.01); *H02M 1/10* (2013.01)

(58) Field of Classification Search
CPC .................................... H02J 4/00; H02M 1/10
See application file for complete search history.

(56) References Cited

U.S. PATENT DOCUMENTS

2016/0043873 A1* 2/2016 Wendt .................... H04B 3/548
                                                                  307/1

FOREIGN PATENT DOCUMENTS

EP        1798834 A2    6/2007

OTHER PUBLICATIONS

Rhodri Sykes, Combined Search and Examination Report issued in connection with corresponding GB Application No. 1705569.0 dated Sep. 29, 2017, 6 pages.

* cited by examiner

*Primary Examiner* — Robert L Deberadinis
(74) *Attorney, Agent, or Firm* — McGarry Bair, P.C.

(57) ABSTRACT

A method and device for operating a power distribution node can include a controllable switching element configured to switch between supplying a power supply to an electrical load and not supplying the power supply to the electrical load, an electrical sensor connected in series to the controllable switching element and configured to generate a monitoring signal representative of an actual switching pattern of the controllable switching element, and a monitoring controller module receiving the monitoring signal.

20 Claims, 6 Drawing Sheets

POWER DISTRIBUTION NODE

BACKGROUND OF THE INVENTION

Electrical circuits can be configured having a switch for controlling an electrical operation, such as enabling or disabling an electrical load. For example, the switch can be controllable to toggle between a first mode of operation, wherein the switch is "closed" intending current to be transmitted from a switch input to a switch output, and a second mode of operation, wherein the switch is "open" intending current to be prevented from transmitting between the switch input and switch output.

Electrical power systems, such as those found in an aircraft power distribution system, employ power generating systems or power sources, such as generators, for generating electricity for powering electrical loads, e.g., in the systems and subsystems of an aircraft. As the electricity traverses electrical bus bars and wiring to deliver power from power sources to electrical loads, power distribution nodes dispersed throughout the power system ensure that the power delivered to the electrical loads meets the designed power criteria for the loads. Power distribution nodes can, for instance, further provide step-up or step-down power conversion, direct current (DC) to alternating current (AC) power conversion or AC to DC power conversion, or switching operations to selectively enable or disable the delivery of power to particular electrical loads, depending on, for example, available power distribution supply, criticality of electrical load functionality, or aircraft mode of operation, such as take-off, cruise, or ground operations.

BRIEF DESCRIPTION OF THE INVENTION

In one aspect, the present disclosure relates to a power distribution node including a controllable switching element configured to switch between supplying a power supply to an electrical load and not supplying the power supply to the electrical load and to encode a validation signal in a desired switching pattern of the switching element, an electrical sensor connected in series to the controllable switching element and configured to generate a monitoring signal representative of an actual switching pattern of the controllable switching element, and a monitoring controller module receiving the monitoring signal and configured to determine the operating status of the power distribution node by validating the monitoring signal against a validation signal.

In another aspect, the present disclosure relates to a method of validating the operation of a power distribution node, including encoding a validation signal in a desired switching pattern, by a switch controller module, controllably requesting a switching element to perform a switching pattern in accordance with the desired switching pattern, by the switch controller module, sensing, by an electrical sensor, an actual switching pattern of the switching element, determining, in a monitoring controller module, the operating status of the power distribution node by validating the actual switching pattern against the validation signal, and providing indication of the operating status of the power distribution node.

DETAILED DESCRIPTION OF THE INVENTION

Figure 1:
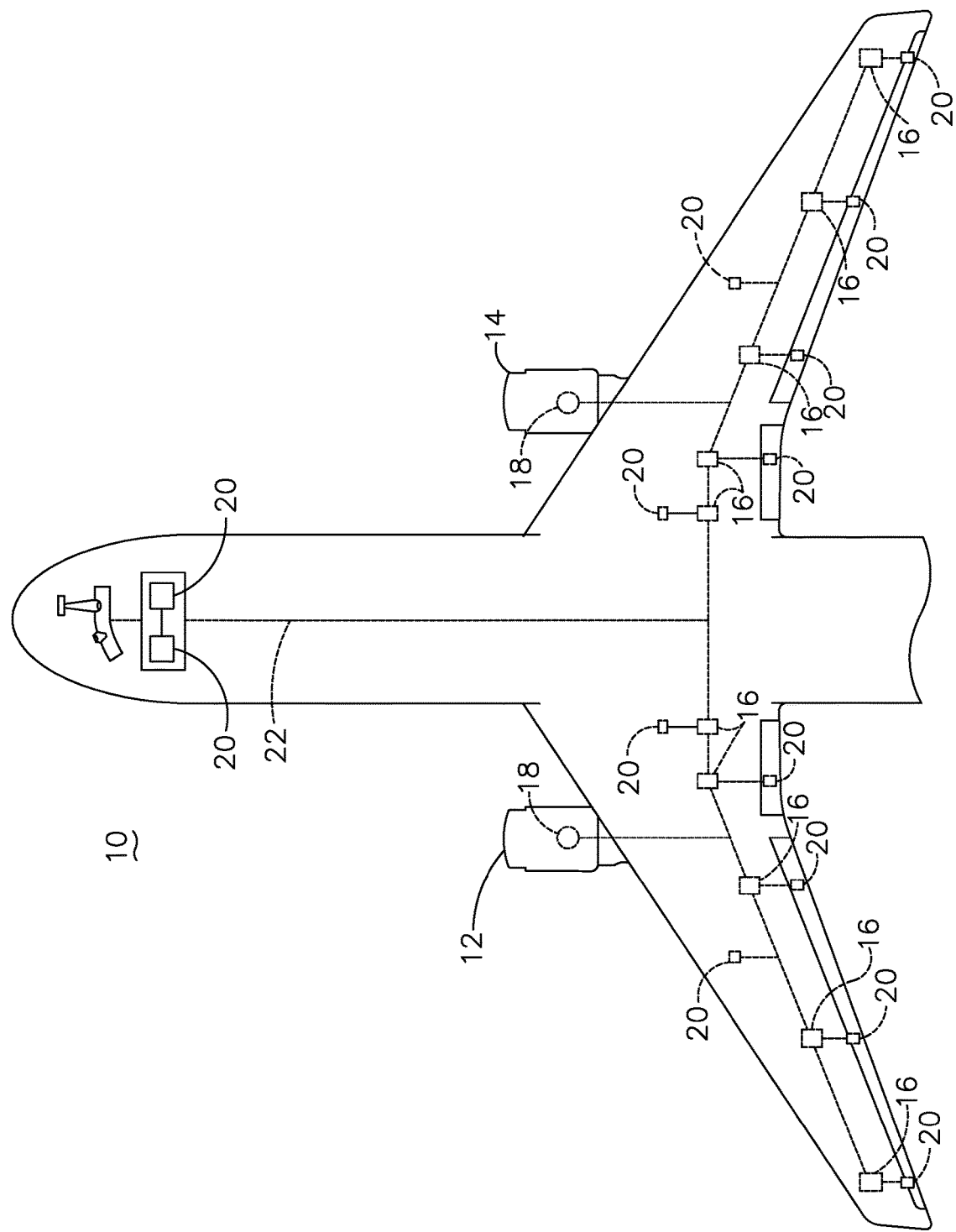
FIG. 1 is a top down schematic view of the aircraft and power distribution system of an aircraft, in accordance with various aspects described herein.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The invention can be implemented in any electrical circuit environment having a switch. A non-limiting example of an electrical circuit environment that can include embodiments of the invention can include an aircraft power system architecture, which enables production of electrical power from at least one spool of a turbine engine, a gas turbine engine, and delivers the electrical power to a set of electrical loads via at least one solid state switch, such as a solid state power controller (SSPC) switching device.

Additionally, while terms such as "voltage", "current", and "power" can be used herein, it will be evident to one skilled in the art that these terms can be interchangeable when describing aspects of the electrical circuit, or circuit operations. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein.

While "a set of" various elements will be described, it will be understood that "a set" can include any number of the respective elements, including only one element. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. The aircraft is shown further having a set of power-consuming components, or electrical loads 20, such as for instance, an actuator load, flight critical loads, and non-flight critical loads. The electrical loads 20 are electrically coupled with at least one of the generators 18 via a power distribution system including, for instance, power transmission lines 22 or bus bars, and power distribution nodes 16. It will be understood that the illustrated aspects of the disclosure of FIG. 1 is only one non-limiting example of a power distribution system, and many other possible aspects of the disclosure and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the generator 18. The generator 18, in turn, generates power, such as AC or DC power, and provides the generated power to the transmission lines 22, which delivers the power to the power distribution nodes 16, positioned throughout the aircraft 10. The power distribution nodes 16 receive the AC or DC power via the transmission lines 22, and can provide switching, power conversion, or distribution management functions, as needed, in order to provide the desired electrical power to the electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, the state of health of the electrical system or loads, or aircraft mode of operation, such as take-off, cruise, or ground operations. Additional management functions can be included. Furthermore, additional power sources for providing power to the electrical loads 20, such as emergency power sources, ram air turbine systems, starter/generators, or batteries, can be included, and can substitute for the power source. It will be understood that while aspects of the disclosure are shown in an aircraft environment, the disclosure is not so limited and has general application to electrical power systems in non-aircraft applications, such as other mobile applications and non-mobile industrial, commercial, and residential applications.

Figure 2:
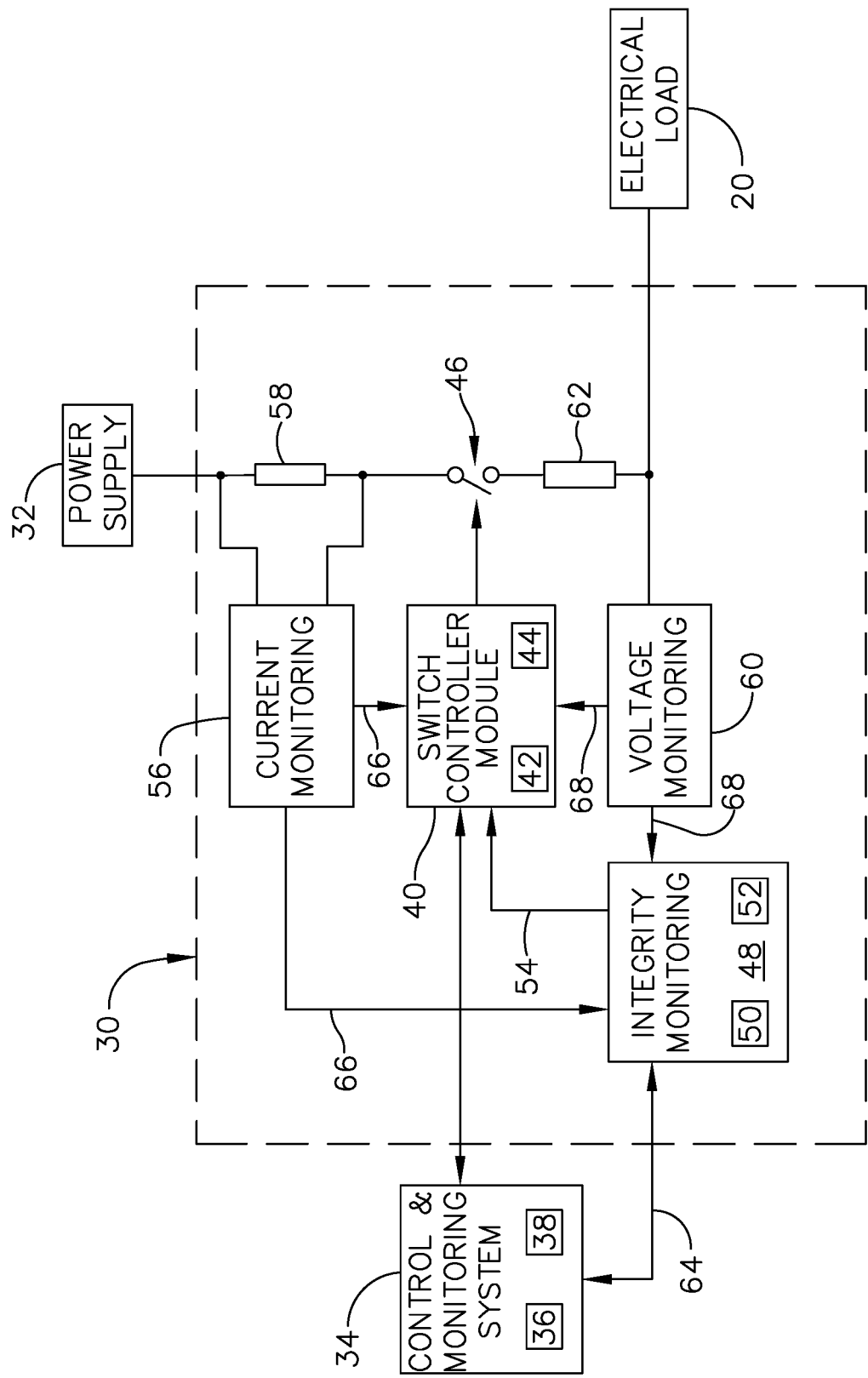
FIG. 2 is a schematic view of a power distribution node and controllable switching element of FIG. 1, in accordance with various aspects described herein.

The operation of a power distribution node 30, is explained with reference to FIG. 2. The power distribution node 30 is similar to the power distribution node 16 of FIG. 1. The power distribution node 30 can be connected to a power supply 32, including, but not limited to, the generator 18, and the electrical load 20. The power distribution node 30 can further be communicatively connected with a control and monitoring system 34, further including a processor 36 and memory 38. The power distribution node 30 can also include an integrity monitoring controller module 48, further including a processor 50 and memory 52.

While the control and monitoring system 34 is illustrated as separate and apart from the power distribution node, aspects of the disclosure can be included wherein, for instance, the control and monitoring system 34 is included with the power distribution node 30, or wherein the control and monitoring system 34 is communicatively connected with a set of power distribution nodes 30. Additionally, why the control and monitoring system 34 is illustrated as separate and apart from the integrity monitoring controller module 48, aspects of the disclosure can be included wherein a single controller module, processor with memory, or the like can effectively operate functionality of both the control and monitoring system 34 and the integrity monitoring controller module 48. For instance, in one non-limiting configuration, each of the control and monitoring system 34 and the integrity monitoring controller module 48 can operate as independent systems or subsystems operating on common hardware.

The power distribution node 30 can include a switch controller module 40 communicatively connected with a controllable switching element 46. The switch controller module can further including a processor 42 and memory 44. The switching element 46 can be connected upstream to the power supply 32 by way of a first resistive element 58, and connected downstream to the electrical load 20 by way of a second resistive element 62. Non-limiting aspects of the disclosure can be included wherein the power distribution node 30 can also include at least one of a current monitoring sensor 56 or a voltage monitoring sensor 60. In one non-limiting example, the current monitoring sensor 56 can measure a current traversing the first resistive element 58. In another non-limiting example, the voltage monitoring sensor 60 can measure a voltage output at the power distribution node 30 output, for instance, relative to electrical ground or a chassis ground.

Aspects of the power distribution node 30 can be included employing a solid state power controller (SSPC). One non-limiting example of the SSPC can include a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included.

The current monitoring sensor 56 can provide or supply a current signal 66 to at least one of the switch controller module 40 or the integrity monitoring controller module 48. In non-limiting examples, the current signal 66 can be representative of the respective current sensed or measured, or a value indicative thereof. Similarly, the voltage monitoring sensor 60 can provide or supply a voltage signal 68 to at least one of the switch controller module 40 or the integrity monitoring controller module 48. In non-limiting examples, the voltage signal 68 can be representative of the respective voltage sensed or measured, or a value indicative thereof. In this sense, the current signal 66, the voltage signal 68, or a combination thereof can be a monitoring signal, representative of the actual switching operations carried out or executed by the switching element 46.

In at least one aspect of the disclosure, the integrity monitoring controller module 48 can receive the at least one of the current signal 66, the voltage signal 68, or a combination thereof, and determine, process, generate, produce, or the like, a monitoring profile, based on the monitoring signals. The integrity monitoring controller module 48 can, in turn, operate functionality based on the receiving of the at least one of the current signal 66, the voltage signal 68, or a combination thereof. The integrity monitoring controller module 48 can further determine, produce, generate, provide, or the like, an output signal, including but not limited to, a switch controller module output signal 54, provided to the switch controller module 40, or a communication signal 64, provided to the control and monitoring system 34.

During operation of the power distribution node 30, the switch controller module 40 can enable or operate the switching functionality of the controllable switching element 48 by way of a communicated control signal. The integrity monitoring controller module 48 can additionally communicate a switch controller module output signal 54, provided to the switch controller module 40 for at least partially controlling or operating the switching element 46. In non-limiting aspects of the disclosure, the output signal 54 can include at least a portion of a validation signal selected or configured for validating the operation of the power distribution node 30. The validation signal can include an encoded data string, a sequence of data, or the like. During operations, the switch controller module 40 receives the validation signal via the output signal 54, and encodes the validation signal into the desired switching operations of the switching element 46. Stated another way, the control signal, for controlling the opening and closing of the switching element includes the encoded validation signal.

When the switching element 46 is operated, the opening and closing of the switching element 46 is sensed by at least one of the current monitoring sensor 56 or the voltage sensor 60. The sensing, in turn, sensing the occurrence of the actual switching operations of the switching element 46, which can be different from the desired switching operations of the switching element 46. In one non-limiting instance, the actual switching operations can be different from the desired switching operations when the power distribution node 30, the switching element 46, the switch controller module 40, etc., or a combination thereof, is malfunctioning.

The current monitoring sensor 56 or the voltage sensor 60 generates a respective current signal 66 or voltage signal 68 (e.g. the monitoring signal) representative of the actual switching operations of the switching element 46, and provides the monitoring signal(s) to the integrity monitoring controller module 48. The integrity monitoring controller module 48 then compares the monitoring signal with the validation signal sent to the switch controller module, or a representative signal thereof, in order to validate the integrity of the power distribution node 30 operations. In this sense, the integrity monitoring controller module 48 can be configured to check the integrity of the power distribution node 30, switch controller module 40, switching element 46, or combination thereof by generating a validation signal, and verifying that the switching element 46 operates to carry a representatively encoded validation signal through energizing or de-energizing operations. The energizing or de-energizing operations are sensed and provided back to the integrity monitoring controller module 48 for verification. Thus, the term "integrity," as used herein, refers to the verification or validation.

In one non-limiting instance wherein the monitor signal(s) are equal to, similar to, or substantially the same as the validation signal, the integrity monitoring controller module 48 can determine the power distribution node 30, the switch controller module 40, the switching element 46, or the like, or a combination thereof, are operating normally, as expected, or within predetermined tolerance values. Conversely, in another non-limiting instance wherein the monitor signal(s) are not equal to, not similar to, or substantially different from the validation signal, the integrity monitoring controller module 48 can determine the power distribution node 30, the switch controller module 40, the switching element 46, or the like, or a combination thereof, are not operating normally, or outside of predetermined tolerance values.

In another non-limiting aspect of the disclosure, the lack of monitor signals can indicate the operational status of the power distribution node 30, the switch controller module 40, the switching element 46, or the like. For instance, not receiving a monitoring signal, or receiving an incomplete monitoring signal, within an expected time period can be indicative the power distribution node 30 is not operating normally. Non-limiting aspects of the disclosure can be included wherein the determination can include a comparison of the monitor signal(s) with a predetermined list of known signal, such as within a database or look up table. The inability to verify or validate the monitor signal can be based on, for example, the comparison failing to find or validate the signal against the database.

Regardless of the determination of the correct or incorrect operations of the power distribution node 30, the integrity monitoring controller module 48 can generate an indication or status identifier of operating status of the power distribution node 30, and provide that indication to another component, such as the control and monitoring system 34. In response to receiving the indication or status identifier of the power distribution node 30, the control and monitoring system 34 can respond appropriately. For example, in one non-limiting aspect, the control and monitoring system 34 can log the operating status of the power distribution node 30. In another non-limiting aspect, when the power distribution node 30 is not operating as expected, the control and monitoring system 34 can log an error, provide an indication of the error, disable the power distribution node 30, enable redundant power systems, or a combination thereof.

Figure 3:
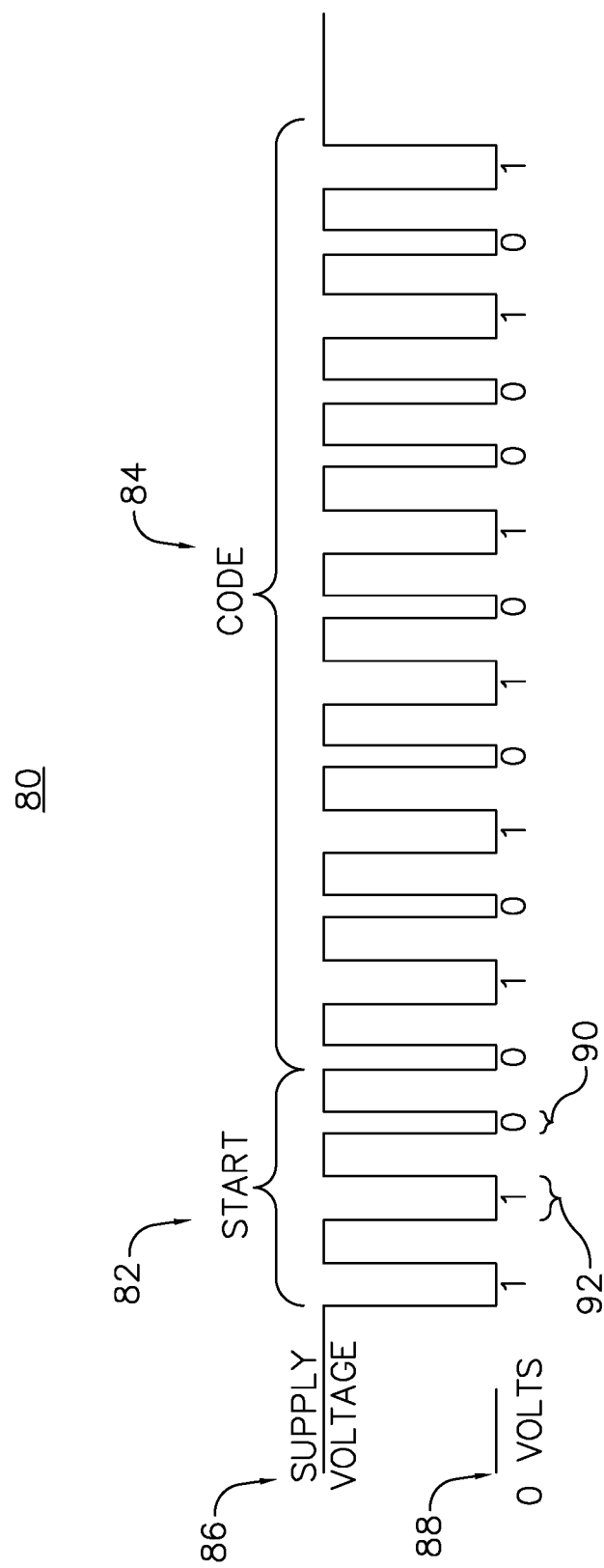
FIG. 3 is a visual representation of a desired or actual switching pattern for the controllable switching element of FIG. 2, in accordance with various aspects described herein.

Turning now to FIG. 3, an example actual switching operation 80 is demonstrated. In the non-limiting example, the actual switching operation 80 is shown based upon the sensing of a voltage signal, which can be the same as the voltage signal 68 of FIG. 2, by way of the voltage monitoring sensor 60. Aspects of the disclosure can be included wherein the actual switching operation 80 is based at least in part on the desired switching pattern or operational status of the power distribution node 30, as described herein. The voltage signal can vary between a supply voltage 86, such as the voltage provided to the electrical load 20, and a ground voltage 88. The actual switching operation 80 can include a starting signal 82 and a coded signal 84. At least one of the starting signal 82 or the coded signal 84 can include a series of digital, binary, or analog signals, illustrated as 1's and 0's.

In one non-limiting example, the signals 82, 84 can be based on, for instance, a timing between actual switching operations 80. A first switching operation from high (e.g. switching element closed) to low (e.g. switching element open), and back to high in a first period of time 90 can represent a digital zero. Conversely, a second switching operation from high to low, and back to high in a second period of time 92, can represent a digital one. In the illustrated example, the second period of time 92 is longer than the first period of time 90. In one non-limiting aspect, the first period of time 90 can be 10 milliseconds, and the second period of time 92 can be 20 milliseconds. In another non-limiting aspect, the timing between bits or signals 82, 84 can be varied to ensure proper sensing, measuring, receiving, or the like. While a time-domain encoding is illustrated, alternative examples of encoding methodology can be included. Non-limiting additional or alternative encoding can include, for instance, multi-frequency tones representing digital information on the monitoring signal (i.e. frequency shift keying), utilizing controlled power interruptions, a combination thereof, or the like.

Aspects of the disclosure can be included wherein at least one of the voltage or current monitoring sensors 56, 60, the integrity monitoring controller module 48, or the like, is configured to operate to validate the encoded validation signal of the actual switching operations 80 after having sensed, determined, or received the starting signal 82. In this sense, the starting signal 82 can be a trigger or alert signal to indicate the coded signal 84 is arriving, following, or the like. In another non-limiting aspect of the disclosure, the starting signal 82 can be utilized to demonstrate timing of the expected coded signal 84.

The coded signal 84 can be representative of the switching controller module output signal 54, including the validation signal. In one non-limiting aspect of the disclosure, at least one of the starting signal 82 can be unique to the encoding described herein. In this sense, the coded signal 84, validation signal, or the like, can be selected to always be different than, or never include, the starting signal 82, to prevent integrity confusion, or resetting the timing or receiving of the starting signal 82. Aspects of the disclosure can be included wherein the first and second periods of time 90, 92 are significantly shorter than a period of time that could have a detrimental effect on a downstream component, such as the electrical load 20. For instance, the first and second period of time 90, 92 can be shorter than a disruption period for the electrical load, or a period of time that would reset the electrical load. In this sense, the electrical load 20 will not "see" or be effected by the actual switching operations 80 that are occurring much faster than a disrupting period of time. In one non-limiting aspect, a disrupting period of time can include 100 milliseconds to 200 milliseconds, or roughly an order of magnitude longer than the actual switching operations for the starting or coded signals 82, 84. In another non-limiting aspect, the length of the code (i.e. the cumulative starting signal 82 and coded signal 84) can include a compromise between the duration of interruption of the supply and the number of codes which can be employed.

Aspects of the disclosure can be included wherein the coded signal 84 can represent the status or operation of the switching element 46, the switch controller module 42, or a combination thereof. In this sense, the coded signal 84 can provided an encoded message to the integrity monitoring controller module 48 that operational status is acceptable (e.g. within tolerances, performing as expected) or unacceptable (e.g. abnormal operation indicative something is amiss). Additional non-limiting aspects of the disclosure can be included wherein the coded signal 84 is based on a varying, changing, or "rolling" encoding system, whereby the integrity monitoring controller module 48 provides a different validation signal via the output signal 54 for each encoding or validation cycle. In this sense, the rolling encoding system can be utilized to validate not only that the actual switching operation 80 is altered, but that the coded signal is properly conveyed and validated for each cycle. The integrity monitoring controller module 48 would be configured to provide the rolling code, as well as validate the corresponding code received via the actual switching operation 80 against the rolling code.

In yet another non-limiting aspect of the disclosure, the coded signal 84 can include a string of digital values that can represent particularized, determinative, or specific operational states or error messages to the integrity monitoring controller module 48. For example, as shown, the coded signal 84 can include 13 binary bits, which can be selected, encoded, or the like, based on the actual switching operation 80 of the switching element 46, to represent different messages provided to the integrity monitoring controller module 48. In one non-limiting aspect of the disclosure, the encoded message can be representative of a diagnosis or self-test of the switch controller module 40.

In one non-limiting example, the detection, prediction, or indication of an electrical fault in the power distribution node 30 can be represented by a first coded signal 84, whereas normal expected operational status can be represented by a second, different coded signal 84. Any number of messages can be encoded in the coded signal 84, as explained. Aspects of the disclosure can be included wherein the integrity monitoring controller module 48 can respond or operate in response to the receiving of a specific or determinative coded message 84 in a predetermined or dynamic fashion. In yet another aspect of the disclosure, additional information can be encoded into the coded message, including, but not limited to, identifying or location information for the power distribution node 30, the importance of the status message encoded (e.g. urgent priority, low priority, etc.), sensor-like data (temperature, current or voltage monitoring values), controllability (difficulty turning on or off switching element 46), built-in testing or built-in test data for the power distribution node 30 or system, or the like. In this sense, any further identifying information can be utilized or logged in order to expedite further diagnosis, maintenance, repair, or the like.

Figure 4:
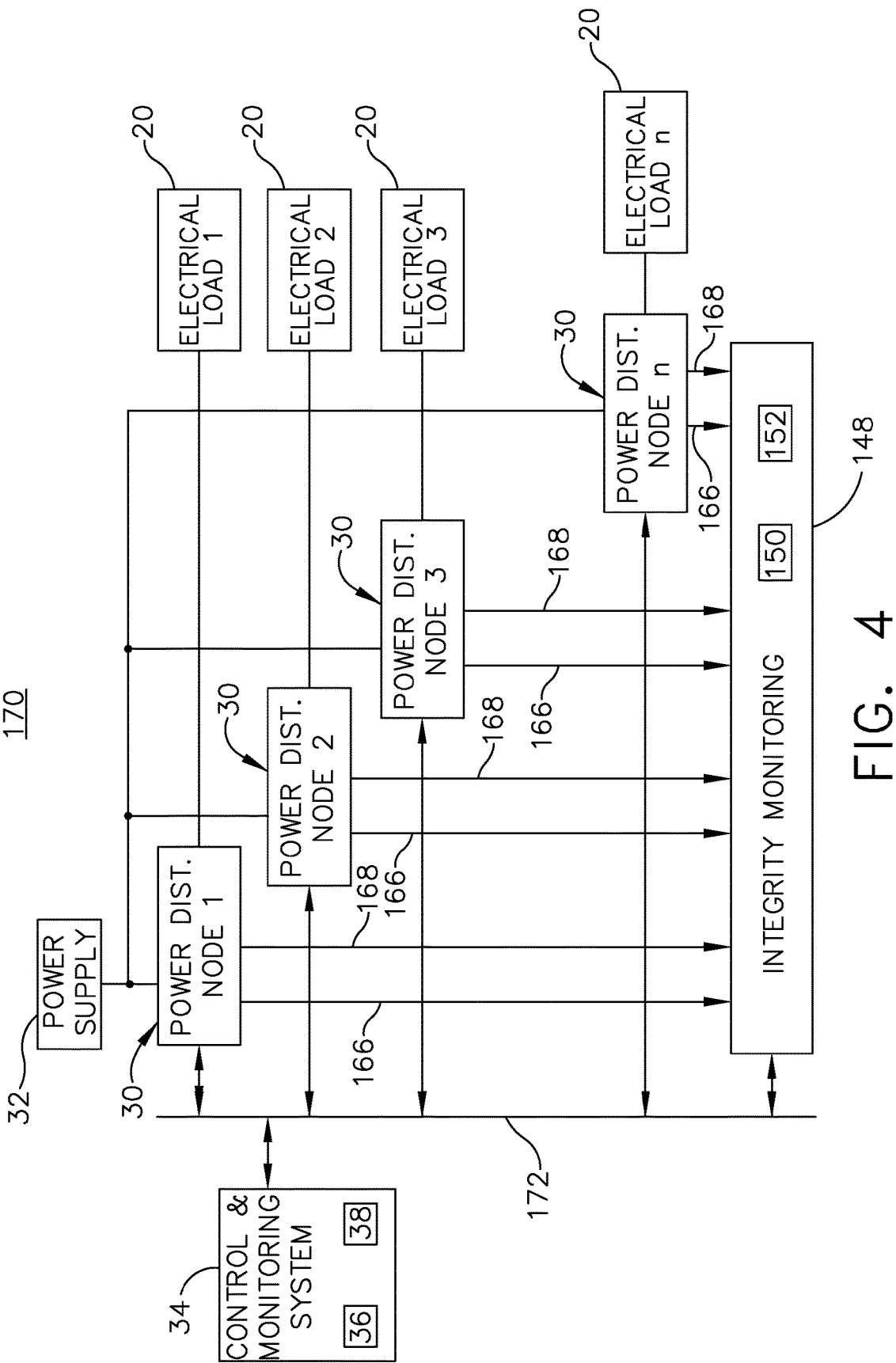
FIG. 4 is schematic view of an array of power distribution nodes, in accordance with various aspects described herein.

FIG. 4 illustrates a non-limiting aspect of the disclosure, illustrating a power distribution system 170 having a set, series, array, or the like, of power distribution nodes 30 (illustrated as node 1, node 2, node n, etc.) selectively providing or enabling power to a corresponding set of electrical loads 20 (illustrated, respectively, as load 1, load 2, load n, etc.). The power distribution nodes 30 are similar to the power distribution nodes of FIG. 2, unless otherwise noted. Like parts will be identified with like numerals increased by 100, with it being understood that the description of the like parts of power distribution nodes 30, unless otherwise noted. One difference is that the power distribution system 170 includes a single illustrated integrity monitoring controller module 148 having a processor 150 and memory 152, and a single illustrated control and monitoring system 34 connected with the set of power distribution nodes 30 via a common bus or communications interface 172. As shown, the set of power distribution nodes 30 can provide a respective set of current signals 166 or a respective set of voltage signals 168 to the integrity monitoring controller module 148, which can effectively operate, manage, or enable the validation and verification status of the set of power distribution nodes 30, as described herein.

Figure 5:
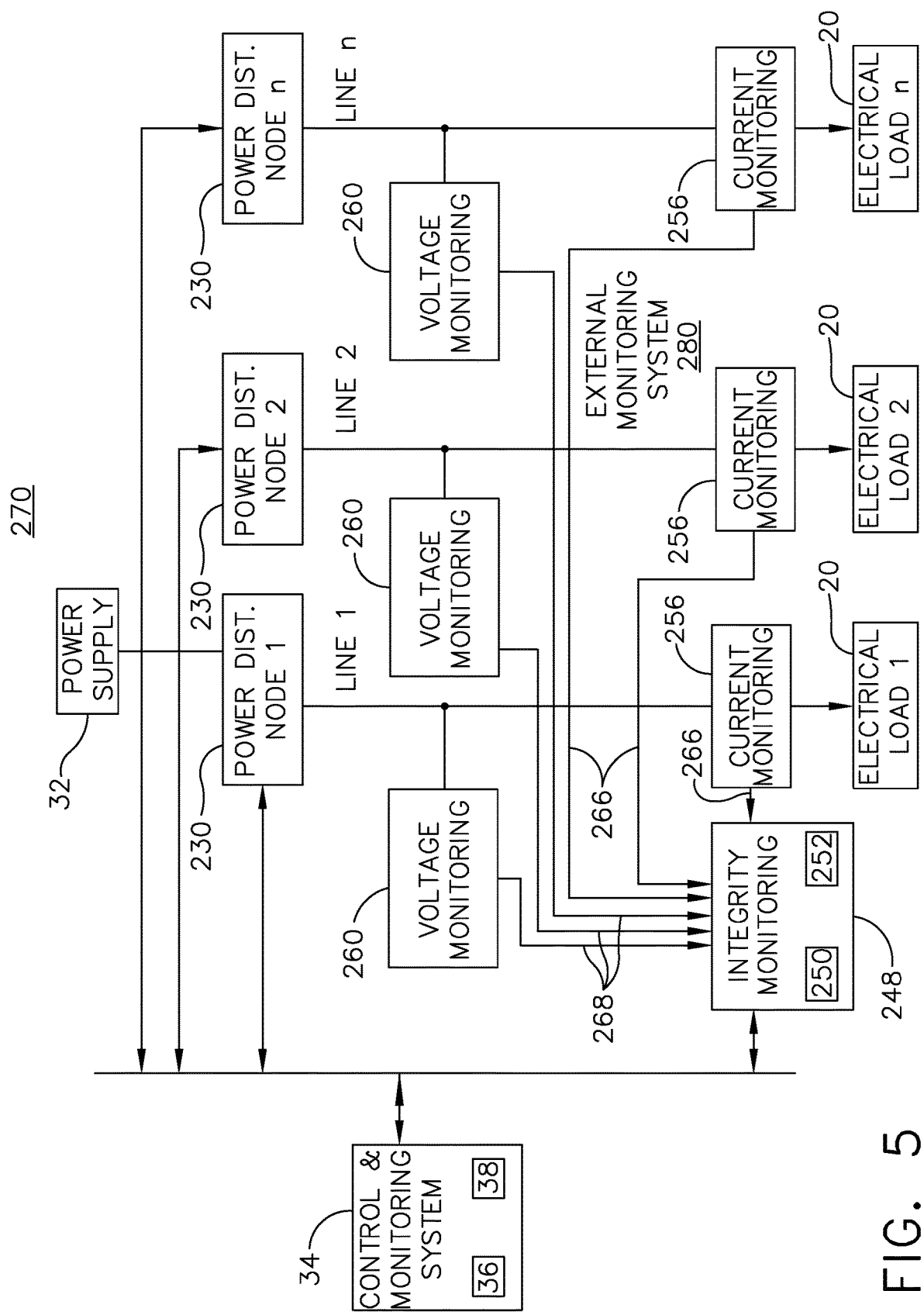
FIG. 5 is another schematic view of an array of power distribution nodes, in accordance with various aspects described herein.
Figure 6:
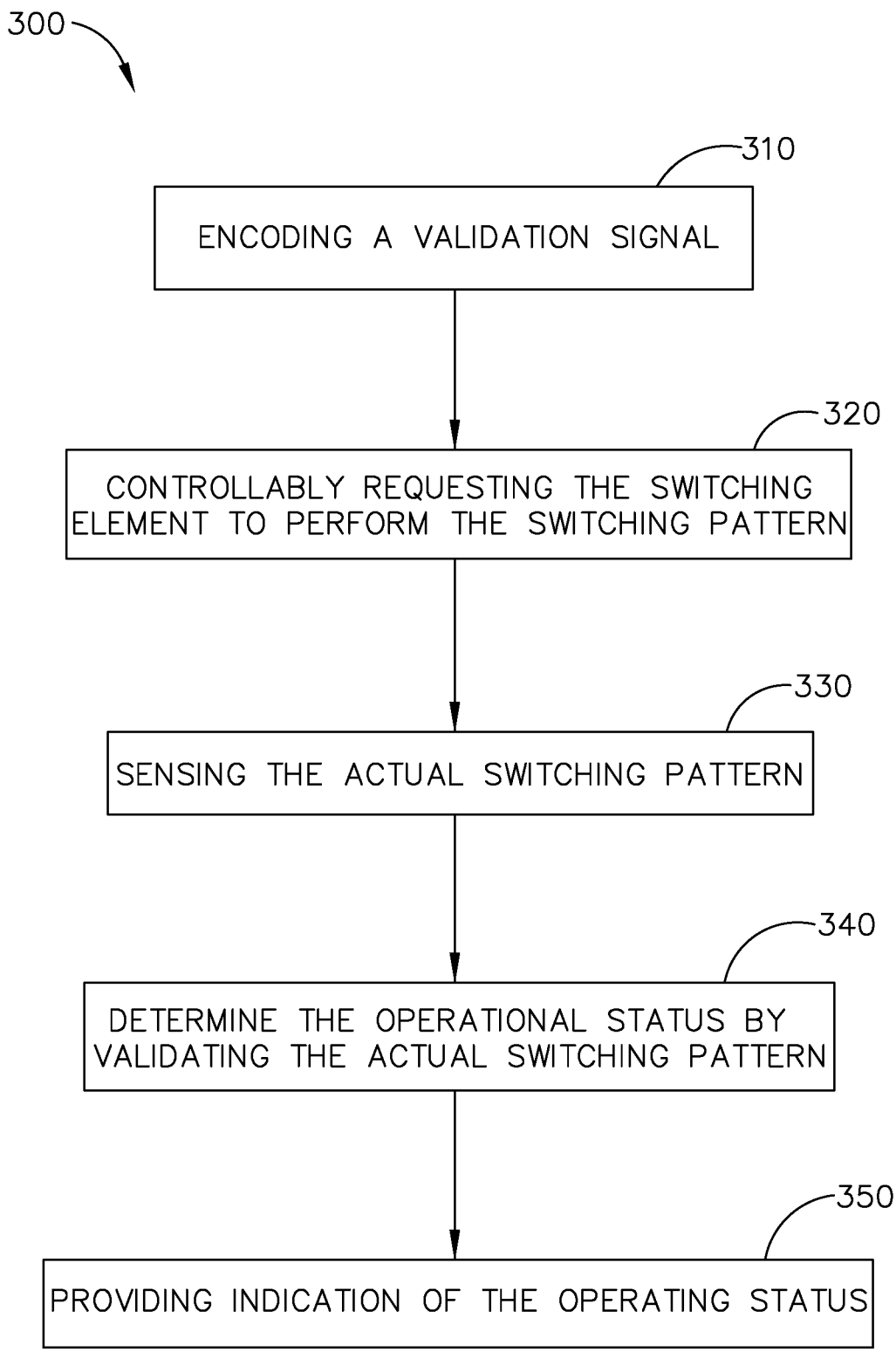
FIG. 6 is an example a flow chart diagram of demonstrating a method validating the operation of the power distribution node of FIG. 2, in accordance with various aspects described herein.

FIG. 5 illustrates a non-limiting aspect of the disclosure, illustrating a power distribution system 270 according to another aspect of the present disclosure. The power distribution system 270 is similar to the power distribution system 170; therefore, like parts will be identified with like numbers increased by 200, with it being understood that the description of the like parts of the power distribution system 170 applies to the power distribution system 270, unless otherwise noted. A difference between the earlier described aspects is that the power distribution system 270 can include a separate, external, retrofit, or the like, external monitoring system 280.

The external monitoring system 280 can include the integrity monitoring controller module 248 including a processor 250 and memory 252, a set of current monitoring sensors 256 disposed in series between a respective power distribution node 230 and electrical load 20, and a set of voltage monitoring sensors 260 disposed to sense the output voltage of the respective power distribution node 230. The set of current monitoring sensors 256 generate a respective current signal 266 provided to the integrity monitoring controller module 248 and the set of voltage monitoring sensors 260 generate a respective voltage signal 268 provided to the integrity monitoring controller module 248. Additionally, the integrity monitoring controller module 248, the control and monitoring system 34, and the set of power distribution nodes 230 can be communicatively connected by way of a common bus or communications interface 272.

Aspects of the external monitoring system 280 can be included in power distribution system 280 not having or including the current or voltage monitoring, or integrity monitoring functionality described herein. Thus, the external monitoring system 280 can be utilized to improve, upgrade, retrofit, or modify the integrity monitoring functionality.

FIG. 5 illustrates a flow chart demonstrating a method 300 of validating the operation of a power distribution node 30, 230. The method 300 begins by encoding a validation signal in a desired switching pattern, by a switch controller module 40, at 310. Next, the method 300 controllably requests the switching element 47 to perform a switching pattern in accordance with the desired switching pattern, by the switch controller module 40, at 320. The method 300 continues by sensing, by an electrical sensor such as the current monitoring sensor 56, 256, voltage monitoring sensor 60, 260, or a combination thereof, an actual switching pattern 80 of the switching element 47, at 330.

The method 300 then determines, in a monitoring controller module such as the integrity monitoring controller module 48, 148, 248, the operating status of the power distribution node 30 by validating the actual switching pattern 80 or the coded signal 84 against the validation signal, at 340. Next, the method 300 provides indication of the operating status of the power distribution node 30. Non-limiting aspects of the providing indication can include logging messages or error messages, providing an audible or visual alert, enabling or operably causing the control of one or more power distribution nodes 30, or the like, as described herein.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method.

Many other possible embodiments and configurations in addition to that shown in the above figures are contemplated by the present disclosure. Additionally, the design and placement of the various components can be rearranged such that a number of different in-line configurations could be realized.

The embodiments disclosed herein provide a method and power distribution node for validating the operation of the node. The technical effect is that the above described embodiments enable the detection or integrity validation of the operational status of the power distribution node during routine or normal operational switching. One advantage that can be realized in the above-described embodiments is that the above described embodiments provide for a device and process for detecting, validating, or alerting a user or system to a failure of a solid state switch that may not otherwise be detected until the switch actually fails in a constant on or constant off state. By encoding a validation signal, then operating and sensing a corresponding signal according to actual switching operations, the operational status of the power distribution node can be validated or ensured via an integrity process to identify the operational status prior to further failure or system harm.

By monitoring the operation status of the power distribution node, the method and device can effectively reduce the likelihood that hazardous voltages or unmanaged current will have unintended consequences on the electrical circuit, including creating shorts, voltage spikes, thermal consequences such as fire, of shocking hazards. Reducing the likelihood of unintended consequences increases the overall safety of the electrical system.

Another advantage of the above-described aspects is that the validation signal or coded signal can be transmitted to the integrity monitoring controller module by way of normal switching operations of the switching element. The normal switching operations can include the validation signal or coded signal without interrupting the power supplied to the electrical load. Furthermore, as described, aspects of the disclosure can be included in power distribution nodes, or retrofitted in existing power distribution systems to ensure operational status of power distribution nodes. For example, aspects of the disclosure can be included in all power distribution nodes, or in critical power distribution nodes wherein switch operation needs to be assured at all times. Thus aspects of the disclosure will provide a higher integrity and validation of current operations.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution node, comprising:
a controllable switching element configured to switch between supplying a power supply to an electrical load and not supplying the power supply to the electrical load and to encode a validation signal in a desired switching pattern of the switching element;
an electrical sensor connected in series to the controllable switching element and configured to generate a monitoring signal representative of an actual switching pattern of the controllable switching element; and
a monitoring controller module receiving the monitoring signal and configured to determine the operating status of the power distribution node by validating the monitoring signal against a validation signal.

2. The power distribution node of claim 1 wherein the desired switching pattern includes a starting signal and a coded signal.

3. The power distribution node of claim 1 wherein the monitoring controller module is communicatively connected with a set of power distribution nodes.

4. The power distribution node of claim 1 wherein the monitoring signal is a digital representation of the actual switching pattern of the controllable switching element.

5. The power distribution node of claim 1 wherein the validation signal varies over a period of time.

6. The power distribution node of claim 1 wherein the monitoring controller module is communicatively connected with the controllable switching element.

7. The power distribution node of claim 6 wherein the monitoring controller module provides the validation signal to the controllable switching element.

8. The power distribution node of claim 6 wherein the monitoring controller module provides at least a portion of the validation signal to the controllable switching element.

9. The power distribution node of claim 1 wherein the controllable switching element is configured to encode an operational status in the desired switching pattern of the switching element.

10. The power distribution node of claim 9 wherein the monitoring controller module includes a database having a set of operational statuses, and wherein the monitoring controller module is configured to determine the operating status of the power distribution node by validating the monitoring signal against the set of operational statuses.

11. The power distribution node of claim 9 wherein the operation status includes a health status indication.

12. The power distribution node of claim 1 wherein the controllable switching element is configured to encode a power distribution node identifier in the desired switching pattern of the switching element.

13. The power distribution node of claim 1 wherein the controllable switching element configured to encode a validation signal in a desired switching pattern that not interrupt operation of the electrical load.

14. A power distribution system comprising at least one power distribution node of claim 1 and a controller module configured to operate the at least one power distribution node based at least in part on the determination of the operating status by the monitoring controller module.

15. A method of validating the operation of a power distribution node, the method comprising:
encoding a validation signal in a desired switching pattern, by a switch controller module;
controllably requesting a switching element to perform a switching pattern in accordance with the desired switching pattern, by the switch controller module;
sensing, by an electrical sensor, an actual switching pattern of the switching element;
determining, in a monitoring controller module, the operating status of the power distribution node by validating the actual switching pattern against the validation signal; and
providing indication of the operating status of the power distribution node.

16. The method of claim 15 wherein the encoding the validation signal includes encoding a validation signal indicative of the operational status of the power distribution node.

17. The method of claim 15 wherein the encoding the validation signal includes encoding a varying validation signal.

18. The method of claim 15, further comprising providing, by the monitoring controller module, the validation signal to the switch controller module.

19. The method of claim 15 wherein the providing includes providing indication of the operational status of the power distribution module to another power distribution controller module.

20. The method of claim 19 further comprising operating, by the power distribution controller module, the power distribution node based at least in part on the provided indication of the operational status.

* * * * *